US008116821B2

(12) United States Patent
Le Pezennec et al.

(10) Patent No.: US 8,116,821 B2
(45) Date of Patent: Feb. 14, 2012

(54) SYSTEM AND ANTENNA FOR RADIO ACCESS NETWORKS

(75) Inventors: Yannick Le Pezennec, Madrid (ES); Brendan McWilliams, Madrid (ES); Javier Lopez Roman, Mardid (ES); Santiago Tenorio Sanz, Madrid (ES); Manuel Lopez Roman, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 114 days.

(21) Appl. No.: 12/637,634

(22) Filed: Dec. 14, 2009

(65) Prior Publication Data

US 2010/0297990 A1 Nov. 25, 2010

(30) Foreign Application Priority Data

Dec. 12, 2008 (ES) .................................. 200803536

(51) Int. Cl.
*H04M 1/00* (2006.01)
(52) U.S. Cl. ..................... 455/562.1; 455/560; 455/561; 455/553.1; 455/554.2; 343/832; 343/835; 343/836; 343/890; 343/891
(58) Field of Classification Search .................. 455/560, 455/561, 562.1, 553.1, 554.1, 554.2, 555, 455/11.1, 13.1, 13.3, 19, 25; 343/832, 835, 343/836, 890, 891
See application file for complete search history.

(56) References Cited

U.S. PATENT DOCUMENTS

| | | | | |
|---|---|---|---|---|
| 6,047,199 A * | 4/2000 | DeMarco | ...................... | 455/572 |
| 7,053,838 B2 * | 5/2006 | Judd | .............................. | 343/701 |
| 7,205,956 B1 * | 4/2007 | Sychaleun et al. | ............ | 343/890 |
| 7,280,848 B2 * | 10/2007 | Hoppenstein | ................. | 455/561 |
| 7,463,201 B2 * | 12/2008 | Chiang et al. | ................. | 343/702 |
| 7,466,990 B2 * | 12/2008 | Mellor et al. | ................. | 455/523 |
| 7,528,789 B2 * | 5/2009 | Gothard et al. | .............. | 343/834 |
| 2004/0198451 A1 * | 10/2004 | Varghese | ................... | 455/562.1 |

* cited by examiner

*Primary Examiner* — Tuan A Tran
(74) *Attorney, Agent, or Firm* — Workman Nydegger

(57) ABSTRACT

An active antenna with an IP address including a first set of modules (Mi) and a second set of modules (M'j), both sets using a same hardware platform and each set integrating radiofrequency sub-modules. Further including at least an Ethernet connection to the core network for providing the active antenna with capability of operation from an anchor site, and a digital platform integrating a set of modules for base-band processing, operating in one or more of 2G, 3G and LTE technologies. The active antenna includes processing apparatus for control plane of 2G and 3G radio access networks, routing apparatus for Iu, Gb or S1 data relay from/to the core network to provide the active antenna with capability of operation from a relay site. Further included is at least two optical ports for connection in chain with a pair of active antennas in the same relay site and a power supply connection.

12 Claims, 4 Drawing Sheets

SYSTEM AND ANTENNA FOR RADIO ACCESS NETWORKS

TECHNICAL FIELD

Embodiments of the present invention relate to the telecommunications field and, especially, in wireless communications networks supporting the second generation (2G), the third generation (3G) or beyond 3G technologies (LTE, WiMax, etc.).

More particularly, embodiments relate to radio network design and deployment based on autonomous active antennas meshed in network via IP (Internet Protocol) connectivity. Its field of application is the industrial area engaged in providing the Radio Access Network (RAN; e.g., UTRAN in UMTS) with radio connection through active antennas to the Core Network (CN).

BACKGROUND OF THE INVENTION

The deployment of a full scale radio access network has always involved the installation of a considerable amount of various equipments. 2G and 3G radio access networks have historically been largely independent networks with little commonalty beyond site and antenna sharing. Traditional radio sites comprehend a number or different cabinets or units hosting transport, baseband, radiofrequency, power supply, batteries, and other equipment. For instance, a typical base station (BTS in 2G or Node-B in 3G) can have a number of different modules depending on its architecture: radiofrequency (RF) front-end module, Power Amplifier (PA) module, baseband (BB) module, and control and transmission modules. The RF modules receive/transmit signals and convert them from/to digital data, and can be split between RF front-end and high power amplifier modules. The BB module processes the signal performing multiplexing/demultiplexing and coding/decoding of the data amongst other operations allowing transmission/reception of the required data. The data is conveyed from/to the Radio Network Controller (RNC) or the Core Network (CN) through the transmission module depending on the Radio Access Network (RAN) architecture (e.g., a flat architecture would allow direct connection to the CN without any RNC for packet-switched data networks). And coordination between these functions is maintained by the control module.

The complexity of radio access network structure has made deployments slow and expensive. Now with the evolution of the technology supporting the trend to simplify the network architecture, it is becoming possible to considerably simplify the radio access network topology.

In this sense, the introduction of Remote Radio Head (RRH) technology brought the RF part of the base station closer to the antenna. The remote radio head (RRH) is a fibre-optic fed active self contained radio unit which allows the remaining elements of the base station (especially baseband units) to be remotely located from the radio head. An RF transceiver typically referred to as Remote Radio Unit (RRU), which performs all necessary RF transmit/receive functions, is installed at the top of the antenna mast or, if not possible, in the vicinity. The remaining parts, generally gathered into one or more cabinets (e.g. baseband, transmission, batteries), could be placed further away from the antenna mast, either indoor or outdoor depending on the building constraints and rental cost (generally cost outdoor are smaller, though this could vary according to the operator local context). Also the use of RRH could allow to centralise a number of base stations into a single site with fibre connections to the corresponding RRU's and antennas, which allows to save rental cost for the location of the cabinets to the expense of more complex fibre connections.

The integration of the RRU units into the antenna has been further improved by the development of the active antenna technology which basically allows all RRU functions to be hosted into the antenna. By this step forward in the technology, the antenna becomes an active element. Previously the active antenna has a passive function of radiating the signal created by the RRU and capturing the energy of the cumulated signals from the terminals in the network. Now the active antenna has an architecture design combining an active device into a part of a passive element. Typically this is achieved by using a number of synchronous RF modules each one transmitting and receiving part of the overall signal, which can be seen as decomposing the high power signal into a number of lower power signals (for example 10 modules of 4 W allowing to build an overall 40 W output power output). ["Active antenna elements for millimeter-wave cellular communications", M. J. Vaughan, W. Wright, R. C. Compton, Signals, Systems, and Electronics, ISSSE '95, URSI International Symposium, 1995].

In addition to this, the introduction of the flat architecture for the packet switching (PS) domain also allowed further simplification of the RAN architecture with the integration of RNC functionalities in the BTS/Node B and Core Network (no BSC/RNC nodes required in the network), whilst historically BSC/RNC's were typically deployed additionally to base stations. This flat architecture, also called Collapsed Architecture because many RNC functions are directly collapsed into the Node B, is based on eHSPA (evolved High Speed Packet Access), defined by the 3GPP release 7 specifications relying on HSPA (High-Speed Downlink Packet Access) and HSUPA (High-Speed Uplink Packet Access) for the 3G data bearers over the air.

FIG. 1 illustrates an example of a typical compact design for a BS site using conventional passive antennas (10, 10', 10"); typically three antennas are used, i.e. one per sector, and a classical cabinet (11) to house a sheltered baseband, transmission, radio, power supply and battery equipment. A typical outdoor base station with a typical configuration has a large footprint and can weight several hundred kilos.

Still, with current RAN architecture, despite the improvement brought by RRH technology (versus classical base station) on each site in addition to the passive antennas, fibre optics connection to each RRU (3 in total, i.e. one RRU per sector) and the self-contained cabinet of the BTS/Node B to host the baseband/transport and potential power supply and battery solutions are still needed. Therefore a breakthrough in terms of the simplification of the site infrastructure is highly desirable in order to ease and speed-up site deployment at a lower operating cost.

SUMMARY OF THE INVENTION

Embodiments of the present invention serve to solve one or more of the aforesaid problems by providing a way to simplify the deployment of a radio access network (RAN) by means of an autonomous Internet Protocol (IP) active antenna which is a self-contained RAN solution, because the IP active antenna here proposed relies on equipment which includes all necessary components to operate a mobile radio access network element with just an external power supply equipment required. The autonomous IP active antenna provides the same site with 2G, 3G, and/or Long Term Evolution (LTE) coverage, without requiring installation of extra equipment to be able to operate (separate active antennas might be required in the case 2G, 3G, and/or LTE are operated in different frequency bands).

An aspect of the invention refers to an active antenna, that is, an antenna made of sub-modules which operate synchronously, each synchronous sub-module integrating RF transmission and reception functions, including low power amplification by low noise amplifiers (LNA) in uplink (UL) and a multi-carrier low to medium power amplifier (MCPA) in downlink (DL), up/down conversion and digital to analogue conversion, filtering and radiating antenna element functions to transmit over the air a high power output signal as well as receive signals with similar sensitivity, as in a classical macro RRH deployment. This active antenna further comprises:

- Base-band (BB) processing: This component handles all the baseband processing required for the transmission and reception of the signals, including modulation/demodulation and coding/decoding relevant to the radio access technology (e.g. 2G, 3G, or LTE).
- Radio network controller (RNC) and Base station controller (BSC) functions, hosting these functions allow to further simplification of the architecture (flat architecture) in 2G and 3G for the support of PS services.
- Routing function to support data relay from the standardized 2G, 3G and LTE data network interfaces: Iu in UMTS, GPRS Gb interface and S1 for LTE. Data is relayed to an "anchor" node within the site topology through a point-to-point (P2P) connection over the air (OTA).
- Two optical chaining ports allowing the chaining of the co-sited autonomous IP active antenna. The active antenna is meant to be a single sector. For instance, in a three-sector sites, three active antennas are required, chained between each other through the corresponding pair of chaining ports.
- Ethernet electrical port for Iu/Gb/S1 over IP connection
- Ethernet optical port for Iu/Gb/S1 over IP connection.

The set of base-band modules for BB processing allows simultaneous operation in one or in a combination of radio access technologies selected from 2G, 3G and LTE. BB processing is implemented in a digital platform which also integrates processing means for control plane function of 2G and 3G radio access networks (e.g. RNC functions in a flat UTRAN architecture) and routing means for data relay from/to a core network in accordance to an standard interface selected from Iu (UMTS), Gb (2G GPRS) and S1 (LTE).

The autonomous IP active antenna is designed to reduce as much as possible the footprint of the overall site solution (i.e. the objective is to occupy as less space as possible on each site) and has the shape of a standard antenna (e.g. an 900 MHz active antenna supporting 2G, 3G and LTE would have a size comparable to the one of a typical 900 MHz), usually meant to be installed outdoors or on a roof.

The autonomous IP active antenna implement all the functionalities from an RNC, Node B (including BB processing and RF) and antenna for transmitting and receiving signals within a radio access network, as well as Iu/Gb/S1 interface transport functionalities, so that there is no extra element required within the radio access network.

The only electrical connection needed is for power supply feeding this autonomous IP active antenna (and the transport connection in the case of an anchor site).

Based on this simplified architecture the radio network is composed of "anchor" and "relay" sites. In relay sites, the data is routed to the assigned anchor sites which provide the physical connection to the CN. The ratio of anchor sites (to relay sites) keeps sufficiently small to make the architecture cost efficient.

Each IP active antenna node has an IP address assigned and can be used in one of two defined modes: either in an anchor mode or in a relay mode. In the anchor mode, the IP active antenna node has a physical IP transport connection to the Core Network (e.g. optical IP connection to the Serving GSN). In the relay mode, the IP active antenna node routes the Iu/Gb/S1 transport data to the anchor site via an OTA P2P connection. In order to perform this P2P connection to route the transport data to the anchor site, the active antenna uses HSPA technology as Iu/Gb/S1 transport technology from the relevant sector of the relay site to the corresponding sector of the anchor site. In the relay mode the active antenna handles the transmission/reception over the air of both usual radio interface (Um/Uu/LTE-Uu) in point-to-multipoint (P2M) and the transport link to/from the anchor site in P2P. Hence there is no need for extra antennas in order to support the Iu/Gb/S1 P2P transport links.

Another aspect of the invention deals with a system for radio access networks comprising a plurality of the autonomous IP active antennas before described for transmitting/receiving RF signals. The system which is proposed here comprises:

- At least one IP active antenna in anchor mode; i.e., physically connected to the Core Network (CN) supporting Internet Protocol (IP) and located at an anchor site. In the anchor site, either one or all sectors can be connected to the transport network. On a typical three-sectorised site, the three active antennas can be chained in order to use a single IP connection.
- At least a pair of IP active antennas per site operating in relay mode and connected to the anchor node over the air. The ratio of anchor sites to relay sites is determined by the trade-off between capacity of the physical IP connections in the anchor site as well as the possibility to find a line of sight connection to the relevant sector of the anchor site in the field.

For every site, all sectors are operated in the same mode, i.e. either in relay mode or in anchor mode. In the network topology, in order to build a relay site for each autonomous IP active antenna, a P2P connection to one IP active antenna of an anchor site needs to be found. The different IP active antennas from one relay site can be connected to different anchor site in order to facilitate the likelihood to find a P2P link to operate in relay mode. The autonomous IP active antennas belonging to the same site are connected together in chain via daisy chain fibre connections. Only autonomous IP active antennas used as anchor nodes are connected to the Iu/Gb/S1 interface through the Ethernet optical port or Ethernet electrical port.

The interconnection between relay IP active antenna and attached anchor IP active antenna is assured using HSPA technology. The capacity of the relay link is influenced by the number of relay links handled by the anchor IP active antenna and also the characteristics of propagation between both the anchor and relay antennas. For a high capacity link over HSPA, the ratio of relay links to the anchor sector should be low (e.g. 2 to 4 links for one anchor IP active antenna) and it is desirable to install the relay IP active antennas in such a way to have a line of sight. If not possible to find a line of sight in certain scenarios, it is still possible to connect with the anchor to the expense of a lower capacity of the P2P link.

The system is easily expandable in sites. When a new IP active antenna is required to be installed, an IP address is assigned to it. This IP antenna connects to the relevant anchor IP active antenna using the Iu/Gb/S1 interface over HSPA. In order to facilitate the relay site installation, a self discovery function can be used to facilitate the establishment of the relay link to the anchor. This is possible by associating in the O&M the cell identifier of the anchor sites with the corresponding IP address by measuring the Primary-Common Pilot Channel (P-CPICH) received from the different anchor IP active antennas. The P2P link can be optimized towards the best server (highest CPICH received) if the number of connections to this anchor IP active antenna is according to the design limit set by the operator. The Iu/Gb/S1 transport traffic is routed to the IP address assigned to the anchor site, which in turn routes it to the transport network backhaul. As a result of using HSPA, there is neither need of optical fiber, coaxial nor any type of additional transmission equipment, which reduces significantly installation costs and speed-up deployments. Depending on the ratio of anchor to relay sites, it is possible to dynamically reassign the P2P relay link between anchor IP active antennas. The routing of Iu/Gb/S1 transport traffic can then make of the most of different routes, as in a typical IP network, with QoS inherently supported over HSPA transmission relay network . . . .

The benefits of the present invention are translated into cost and time savings in 3G network deployment, thanks to a simplification of the overall network topology to a maximum as it allows making the deployment of radio access networks much faster by stripping down the number of equipment to just one autonomous active antenna node per sector.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF EXAMPLE EMBODIMENTS

Figure 1:
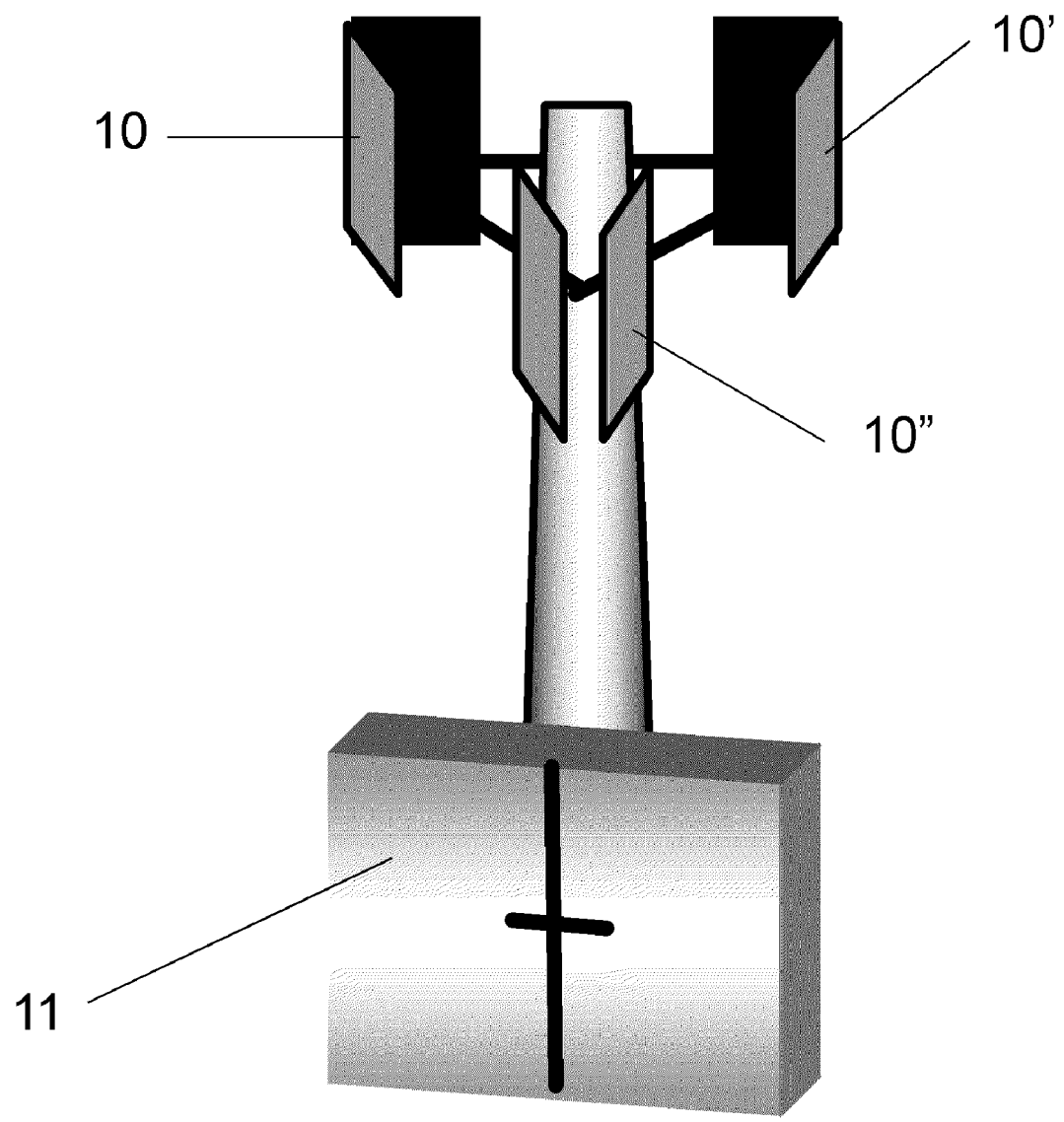
FIG. 1.—It shows a schematic representation of the typical base station site defined in the prior art.
Figure 2:
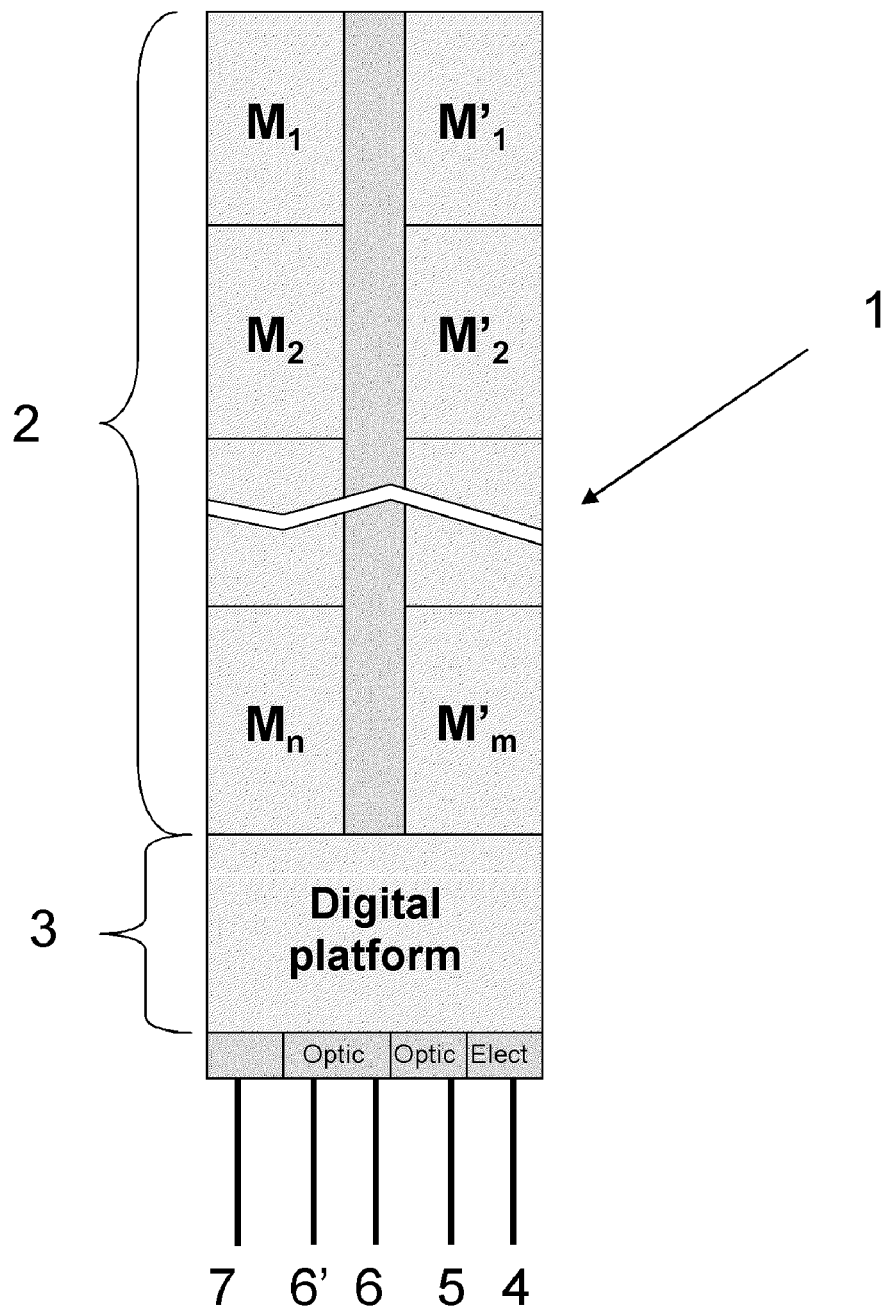
FIG. 2.—It shows a block architecture of the autonomous IP active antenna in accordance to a preferred embodiment of the invention.

FIG. 2 illustrates the architecture of the autonomous IP active antenna (1) comprising RF modules (2), BB modules built in a digital platform (3) which also implements the RNC and the routing functions, an Ethernet electrical port (4) for Iu interface, an Ethernet optical port (5) for Iu interface, two optical chaining ports (6, 6') for two co-site autonomous IP active antennas and the power supply connector (7).

An option of implementing the autonomous IP active antenna (1) architecture is using a first set of modules ($M_1$, $M_2$, . . . , $M_n$) used for P2M transmission on the radio Uu interface and a second set of modules ($M'_1$, $M'_2$, . . . , $M'_m$) for the P2P transmission in relay mode to the anchor site, being first set of modules ($M_1$, $M_2$, . . . , $M_n$) independent with respect to the second set of modules ($M'_1$, $M'_2$, . . . , $M'_m$), $m \geq 1$, $n \geq 1$, $m=n$ or $m \neq n$. All these modules ($M_1$, $M_2$, . . . , $M_n$) and ($M'_1$, $M'_2$, . . . , $M'_m$) can be similar, i.e. the same hardware platform can be reused, but functionally the first set of RF modules ($M_1$, $M_2$, . . . , $M_n$) is used for transmitting/receiving signals from/to the mobile equipments while the RF modules ($M'_1$, $M'_2$, . . . , $M'_m$) of the second set are used to handle the P2P relay link to the relevant anchor IP active antenna. In order to point to the relevant anchor site, the RF modules ($M_1$, $M_2$, . . . , $M_n$) for the radio interface—Mi modules—allow a control of the beam formed by these Mi modules which is independent with respect to the beam formed by the other set of modules ($M'_1$, $M'_2$, . . . , $M'_m$)—M'j modules—. In order to fully optimise the transmission link, the M'j modules need to be more directive than the Mi modules used for Uu (but this is not indispensable, it can be seen as an optimisation).

As the active antenna is usually attached to a pole or mast, the installation of both sets of RF modules, Mi and M'j, follows a proper mechanical disposition so that the radiation pattern cannot be affected; for example, M'j modules can not be located in the vicinity of the mast at the back of the antenna. These M'j modules could be located for example over the set of Mi modules or adjacent to them.

Figure 3:
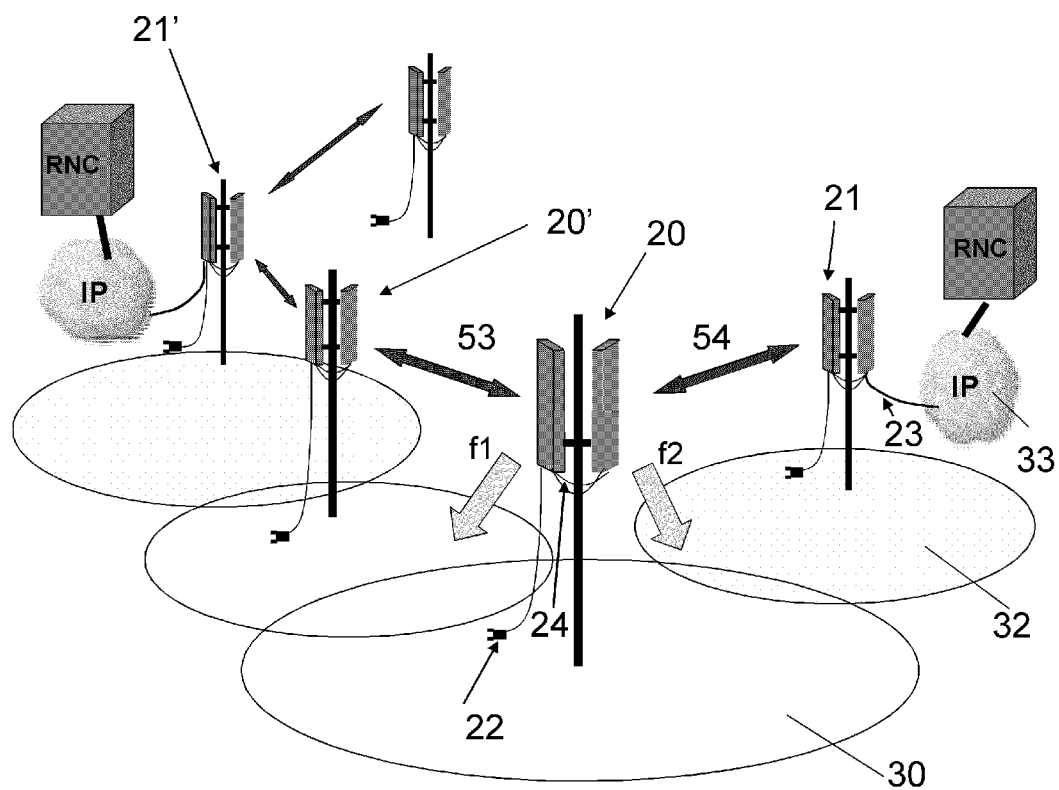
FIG. 3.—It shows a schematic representation of a radio access network topology based on a plurality of "anchor" autonomous IP active antennas and multiple "relay" IP active antennas associated directly or indirectly to one "anchor" IP antenna.

An option of implementing the autonomous IP active antenna (1) architecture is using the same set of modules for radio Uu interface and transmission to the anchor site. This considerably simplifies the design of the autonomous IP active antenna solution. One example of scenario is shown in FIG. 3, which illustrates an IP active antenna in relay mode (20) operating at a Uu carrier (f1), e.g., UMTS 2100 MHz, and a second carrier (f2) being used for Iub connection to an anchor node or anchor site (21) over HSDPA. Each IP active antenna (20, 21) provides 2G, 3G and LTE coverage (30, 32). In this case a single set of modules can be shared, i.e. all the Mi and Mj' modules shown in FIG. 2 can be reused for Uu transmission/reception. This is possible assuming that one of the three sectors, i.e. one of the three active antennas on the site, is pointing to the direction of the anchor site (21), which provides Iu data transport to the radio network controller (RNC) over an IP connection.

In case of using different carriers (f1, f2) of the same frequency band, a separate downtilt between the carriers, f1 for Radio and f2 for Transmission to the anchor node (21), can be achieved. This is a cheaper option although with reduced link performance for the connection towards anchor site, so it is a less optimised solution for the connection to the anchors site. This solution might not be possible in all deployment scenarios because it is mainly applicable to scenario when the transmission to the anchor site is performed on a separate carrier of the same band.

Figure 4:
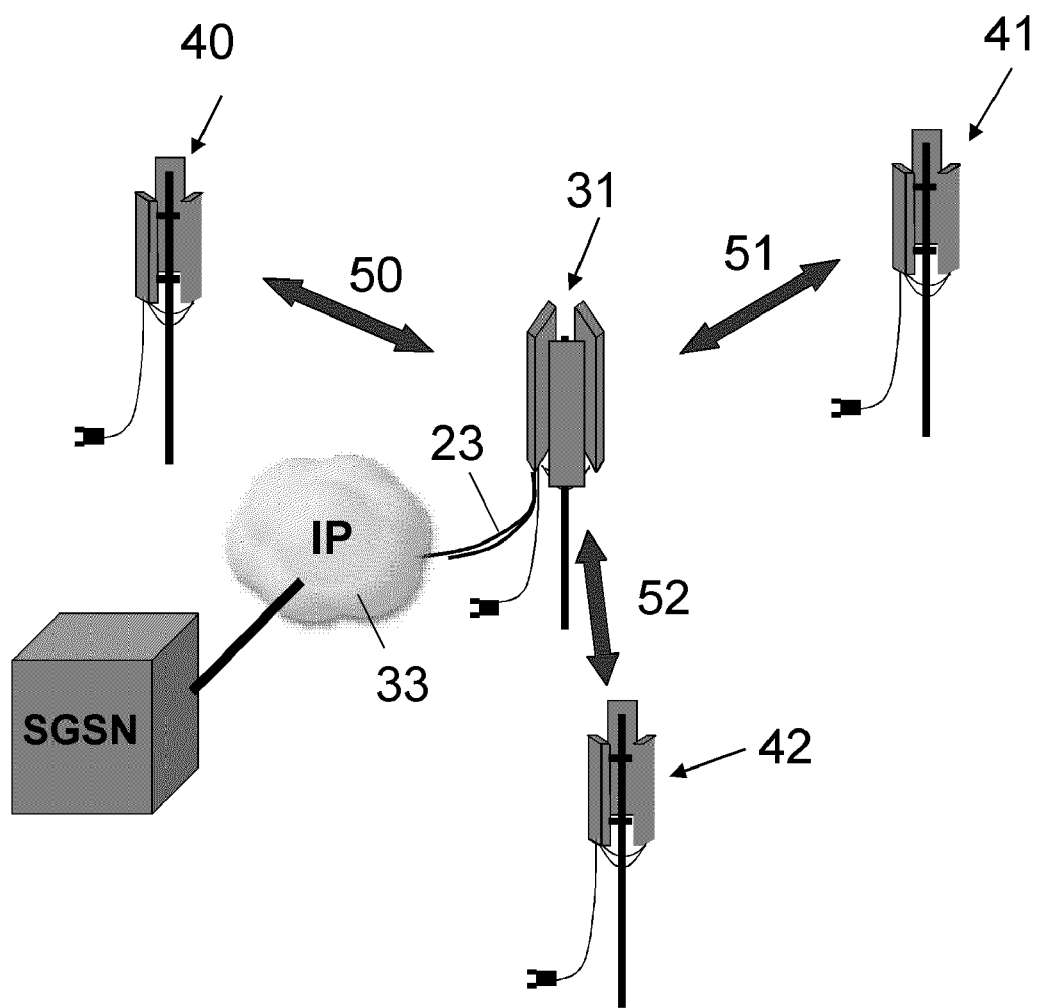
FIG. 4.—It shows a schematic representation of a radio access network topology using autonomous IP active antennas in anchor and relay modes.

FIG. 4 illustrates the overall radio network architecture based on the proposed type of IP active antenna which allows the simplification of the site solution. The complexity in terms of physical transport network physical connections is simplified thanks to the introduction of relay sites (40, 41, 42) where the transport links are handled via wireless P2P links (50, 51, 52) using HSPA technology. In each relay site (40, 41, 42) one sector must be in line of sight to a sector of the anchor site (31) or at least be in such a condition that allows a good radio P2P link to be setup between the two. The anchor site has a physical Ethernet connection (23) to the Core network (33) over IP, e.g., through an Ethernet optical port to the Serving GPRS Support Node (SGSN).

FIG. 3 and FIG. 4 show that the only electrical connection needed in the IP active antenna, independently of its operating mode—anchor or relay—is just a power supply connection (22). No other physical connections are required at relay sites. If the IP active antenna is at the anchor site, in addition to the power supply connection (22), at least one of the sectors of the site requires an Ethernet connection (23) to the Core network (33). All the sectors of a site operate in a same—anchor or relay—mode, being connected altogether through fibre connections in chain (24) to use the single Ethernet connection (23).

Returning to FIG. 3, two anchor sites (21, 21') are shown and the network scenario of this FIG. 3 also illustrates that more than one relay level is possible. The IP active antenna in relay mode (20) is connected through a direct link (54), e.g., over HSDPA, to the anchor site (21) and is also connected to another anchor node (21') indirectly, that is, through an intermediate relay node (20') to which the active antenna in relay mode (20) has a connection (53).

The terms in which this specification has been worded are always to be taken in the broadest sense and not restrictively.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. An active antenna including at least one sector and a plurality of radiofrequency sub-modules operating synchronously for radiofrequency transmission and reception of high power output signals, each radiofrequency sub-module including a radiating antenna element, low power amplifiers for uplink and downlink, up/down conversion, digital to analogue conversion and filters adapted to process a certain part of the high power output signal, the active antenna comprising:
    a first set of n modules ($M_i$), i=1, 2, ..., n, and a second set of m modules ($M'_j$), j=1, 2, ..., m, both sets of modules ($M_i$, $M'_j$) using a same hardware platform and each set of modules ($M_i$, $M'_j$) integrating radiofrequency sub-modules;
    a digital platform comprising:
        a set of base-band modules for base-band processing and operating in at least one radio access technology selected from 2G, 3G and LTE;
        processing means for control plane of 2G and 3G radio access networks; and
        routing means for data relay from/to a core network in accordance to an standard interface selected from Iu, Gb and S1; and
    at least an Ethernet connection to the core network;
    a power supply connection;
    at least two optical ports for connection in chain with sectors of a pair of active antennas; and
    an IP address assigned thereto.

2. The active antenna according to claim 1, wherein all the sectors connected through the two optical ports operate in an anchor mode using the IP address assigned and the Ethernet connection to the core network for IP transport of data.

3. The active antenna according to claim 1, wherein all the sectors connected through the two optical ports operate in a relay mode using the routing means for data relay over the air to another active antenna connected to the core network for IP transport of data.

4. The active antenna according to claim 3, wherein the second set of m modules ($M'_j$) is used for connection over the air to another active antenna connected to the core network.

5. The active antenna according to claim 3, wherein the second set of m modules ($M'_j$) is used for connection over the air to another active antenna which operates in a relay mode.

6. The active antenna according to claim 1, wherein the first set of n modules ($M_i$) is used for connection over the air though a radio interface to at least one mobile equipment and the second set of m modules ($M'_j$) is used for connection over the air to another active antenna.

7. The active antenna according to claim 6, wherein both the first set of n modules ($M_i$) and the second set of m modules ($M'_j$) are used for connection over the air to another active antenna which operates in a relay mode.

8. The active antenna according to claim 1, wherein both the first set of n modules ($M_i$) and the second set of m modules ($M'_j$) are used for connection over the air though a radio interface to at least one mobile equipment and for connection over the air to another active antenna.

9. The active antenna according to claim 8, wherein both the first set of n modules ($M_i$) and the second set of m modules ($M'_j$) are used for connection over the air to another active antenna which is connected to the core network.

10. The active antenna according to claim 1, wherein the Ethernet connection is selected from an electrical port and an optical port.

11. A system for radio access networks split into a plurality of sites comprising a plurality of active antennas defined according to claim 1, wherein:
    at least one active antenna is located at an anchor site and operates in an anchor mode using the IP address assigned and the Ethernet connection to the core network for IP transport of data;
    at least a pair of active antennas is located at a relay site, whose sectors are connected through a pair of two optical ports in chain and all the sectors operating in relay mode, being all the active antennas of the relay site connected over the air to one of the actives antenna located operating in the anchor mode at one anchor site to which the active antennas of the relay site relay data by the routing means.

12. The system according to claim 11, wherein the number of anchor sites with respect to the number of relay sites is determined by a trade-off between capacity of the Ethernet connection of the active antenna in the anchor site and the probability to find a line of sight from the sectors of the active antennas in the relay site to the sector of the active antenna in the anchor site connected to the core network.

* * * * *